United States Patent

Scherer

[11] Patent Number: 5,148,364
[45] Date of Patent: Sep. 15, 1992

[54] REDUNDANT MULTI-CHANNEL CLOSED LOOP CONTROL DEVICE WITH ANALOG INTEGRATORS

[75] Inventor: Wolfgang Scherer, Dachau, Fed. Rep. of Germany

[73] Assignee: MTU Motoren- und Turbinen-Union Muenchen GmbH, Munich, Fed. Rep. of Germany

[21] Appl. No.: 604,826

[22] Filed: Oct. 26, 1990

[30] Foreign Application Priority Data

Oct. 27, 1989 [DE] Fed. Rep. of Germany ....... 3935958

[51] Int. Cl.⁵ .................................. G05B 9/02
[52] U.S. Cl. .................... 364/187; 371/8.1; 364/133
[58] Field of Search ........... 364/148, 184, 187, 132, 364/133; 371/9.1, 8.1; 244/184; 417/286

[56] References Cited

U.S. PATENT DOCUMENTS

| | | | |
|---|---|---|---|
| 3,552,687 | 1/1971 | Howard et al. | 244/184 |
| 4,560,319 | 12/1985 | Blotenberg | 417/286 |
| 4,562,528 | 12/1985 | Baba | 364/187 |
| 4,998,194 | 3/1991 | Okamoto et al. | 364/187 |

Primary Examiner—Jerry Smith
Assistant Examiner—Jim Trammell
Attorney, Agent, or Firm—W. G. Fasse

[57] ABSTRACT

A redundant closed loop control circuit has a plurality of channels, one of which is the presently active or operating channel, while the other channel (or channels) is in a standby state. When the active channel fails, the standby channel is automatically switched on. The switch-over takes place with a certain time delay determined by a time constant. For this purpose each channel has an analog integrator connected with its input to a change-over switch and with its output to a negative input of its own signal summing circuit having at least one positive input connected to the output of the other integrator of the control circuit. The integrator of the active channel receives an input signal through its change-over switch and is disconneced from the output of its own summing circuit. The integrator of the standby channel is connected to the output of its own summing circuit and disconnected from the input signal to thereby form a time delay circuit for the output signal of the integrator in the presently active channel. Thus, the outputs of all integrators are connected to operate in synchronism in a static sense, whereby there is no need for searching for a channel available for switch-over, and whereby undesirable switch-over pulses in the system are avoided due to the time delay.

8 Claims, 4 Drawing Sheets

REDUNDANT MULTI-CHANNEL CLOSED LOOP CONTROL DEVICE WITH ANALOG INTEGRATORS

FIELD OF THE INVENTION

The invention relates to a redundant multi-channel closed loop control device or circuit with an analog integrator section in each channel. The purpose of such redundant channels is to avoid disturbing or interfering pulses in a closed loop control system. Such a circuit is used, for example, in digital engine controls, such as jet engine controls.

BACKGROUND INFORMATION

Multi-channel closed loop controls having several input channels leading to the same or separate closed loop control systems, include circuit means for forming at their output or outputs a combined control signal. The input signals to the closed loop control are, e.g., deviation signals. The term "deviation signals" in this context refers to signals which are formed as a difference signal from a rated signal and an actually measured signal. In such multi-channel closed loop controls it is essential that at any one time only one channel is actually effective while the other channels are in a standby state. This means that only the deviation signal of the presently effective channel is further processed in the closed loop control to form the control signal. The other channels in their standby state are electrically supplied, however, their signals are switched off by a channel switching logic circuit.

A special construction of such a multi-channel analog closed loop control comprises a redundant control device comprising, preferably, two or even more closed loop control channels, all of which should provide substantially the same control signal. Such redundant controls are required where the failure of one control channel would have unacceptable consequences. In order to avoid such consequences, a channel that has become defective is immediately switched over to a second standby channel which now becomes the controlling channel or operating channel.

Closed loop controls of this type may also comprise an integrator section, for example, a proportional integration controller section or a proportional integration differentiation controller section. These integration sections of the standby channel or channels have assumed a positive or negative saturation state because in practice it is not assured that there is a hundred percent conformity among the input channels. As a result, if, in such a case, a standby channel is switched into operation, generally, a disturbing pulse or interfering pulse is generated in the control system due to the signal jump to the saturation value of the newly switched-in or switched-on integrator.

OBJECTS OF THE INVENTION

In view of the foregoing it is the aim of the invention to achieve the following objects singly or in combination:

to construct a multi-channel closed loop control device in such a manner that the mentioned disturbing or interfering pulses are avoided in the control system;

to assure that the disturbing impulses do not occur even if the multi-channel system comprises three or more channels;

to prevent that the standby channel, or rather its integration section, assumes the saturation state;

to provide such a system with an improved response characteristic; and to make sure that the closed loop control signal is the same regardless of which of the plurality of channels is active and which are in a standby condition.

SUMMARY OF THE INVENTION

The multi-channel closed loop control device according to the invention includes an analog integration or integrator section in each channel. Each integrator can receive a control deviation signal separately from the other integrators. The channel that was effective or operational and became defective is switched over by at least one change-over switch. Each integrator of each channel comprises a change-over switch and is connected with the negative input of a summing circuit, whereby the change-over switch connects either the respective control deviation signal or the output of the corresponding summing circuit to the integrator input. The outputs of all integrators of the individual channels are connected through switches with the positive input of the summing circuits, whereby it is made sure that only the switch of the effective integrator is closed and the effective integrator itself is connected to the negative input of its summing circuit, while all other integrators are connected to the positive inputs of the summing circuits of other integrators.

The important advantage of the closed loop controller according to the invention is seen in that the integrator of a standby channel does not run into a saturation state, but rather is carried along, so to speak, with the actively effective integrator output so that at the time of switch-over from one integrator to the other no disturbing impulse is generated. Thus, the switch-over does not cause any disturbance in the control system which is very advantageous.

A summing circuit of the presently inactive or standby channel is connected with its output to the input of the integrating circuit of the respective standby channel. The negative input of each summing circuit is connected to the output of its own, respective integrator circuit. The positive input of each summing circuit receives the output signal of the integrator in the other channel. Thus, the integrator circuit in each standby channel forms with its summing circuit a delay circuit of the first order ($PT_1$-section) for the output signal of the integrator in the currently active channel. As a result, the output of the integrator in the standby channel follows the output of the integrator in the presently active channel with a delay between the two signals corresponding to the integration time constant, whereby in static terms, the integrator outputs correspond to each other.

Another important advantage of the invention resides in the fact, that the delay characteristic may result in an improved operation of the closed loop control system when, upon failure of the operating channel, a switch-over becomes necessary. Assuming that the channel which has become defective produces an unforseeable signal change at its output, which change would not be justified by the signal input at the respective channel, such a signal change is followed by the standby integrator to be switched on only with the mentioned delay due to the $PT_1$-characteristic.

If the switch-over takes place rapidly after the occurrence of a defect, the output signal of the integrator now becoming the active integrator, corresponds more to the actually required control signal. However, such rapid switch-over causes a voltage jump in the control system. Thus, the above mentioned $PT_1$ characteristic with its delay is desirable because it more than compensates for the just mentioned voltage jump. The voltage jump is minimized by selecting the time constant of the $PT_1$-section to an optimal value. Thus, the selected delay caused by the integration time constant of the $PT_1$-section makes sure that the switch-over from the defective channel to a standby channel does not take place immediately upon the occurrence of the defect.

The switch-over from the presently operating now defective channel to the standby channel takes place by the simultaneous switch-over of two single pole-double throw switches, whereby the input of the defective integrator is connected to the output of its summing network, while the input of the standby integrator now receives its deviation signal. The feedback from the output of the summing circuit to the input of the defective integrator forms a delay line of the first order for the signal present at the positive input of this summing circuit. Simultaneously, the input of the standby integrator is switched-off from the output of its own summing circuit to now receive its own deviation signal, whereby the further control is now performed by the channel, which used to be the standby channel.

Preferably, there are arranged buffer or isolating amplifiers between the outputs of the integrators and the positive inputs of the summing circuits of the other integrators for providing a galvanic separation. Instead of the buffer amplifiers, differential amplifiers can be used to provide a high impedance decoupling. These amplifiers assure a complete galvanic decoupling of the individual channels from one another so that, for example, a defective circuit component in one channel does not have any effects on the other channel or channels.

BRIEF DESCRIPTION OF THE DRAWINGS

In order that the invention may be clearly understood, it will now be described, by way of example, with reference to the accompanying drawings, wherein:

FIGS. 2 and 2a show an embodiment with a three-channel circuit, one of which is shown in FIG. 2, while FIG. 2a shows all three channels.

DETAILED DESCRIPTION OF PREFERRED EXAMPLE EMBODIMENTS AND OF THE BEST MODE OF THE INVENTION

Figure 1:
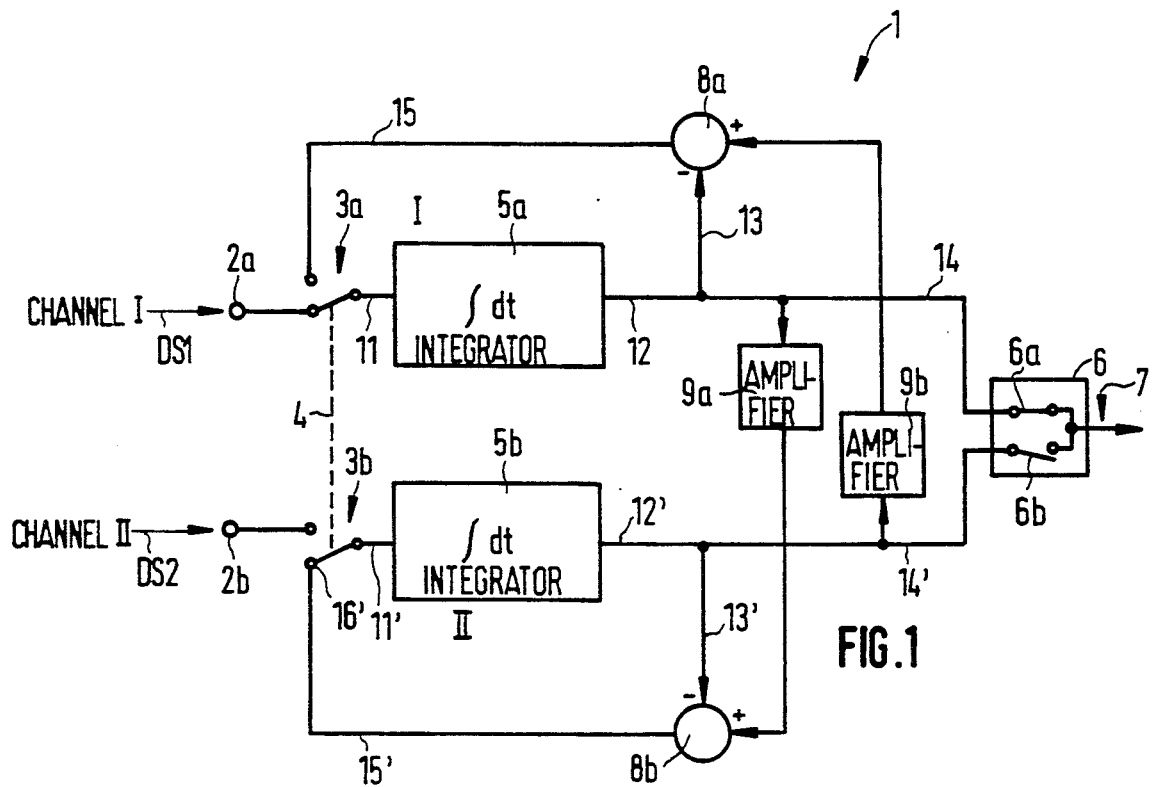
FIG. 1 shows a circuit arrangement according to the invention with two channels.

FIG. 1 shows a redundant closed loop control circuit according to the invention, having two channels I and II. Each channel comprises the same components. The first channel I comprises an analog integrator 5a having an input 11 connected through a single pole-double throw switch 3a to an input terminal 2a to which the deviation signal DS is applied. The integrator has an output 12 connected as follows. A conductor 13 forming first circuit means connects the integrator output 12 to the negative input of a summing circuit 8a. A further conductor 14 forming second circuit means connects the output 12 to output switching means 6 for supplying the control signal to an output terminal 7 of the circuit arrangement. Single pole single-throw switches 6a, 6b are suitable for this purpose. As shown, the channel I is the presently active or operating channel, while the channel II is in the standby state.

Third circuit means, for example in the form of a buffer amplifier 9a, connect the integrator output 12 to a positive input of the summing circuit 8b in the second channel 2. Fourth circuit means 15, such as a conductor, connect the output of the summing circuit 8a to the other terminal 16 of the channel input switching means formed by the two single pole-double throw switches 3a and 3b.

The second channel II is constructed in the same way. Therefore, some of the corresponding reference numbers are merely provided with a prime, namely 12', 13', 14', 15' and 16'. The output 12' is connected through the buffer amplifier 9b to the positive input of the summing circuit 8a. The two channel input switches 3a and 3b are ganged as indicated by the dashed line 4. The channel input switching may be accomplished by mechanical or electronic switches of the single pole-double throw type as mentioned. However, electronic switches are preferred, because they have a higher switching speed and their probability of failure is lower than that of mechanical switches.

The integrators 5a and 5b simultaneously functioning as control amplifiers, may have an integration, or proportional integration or proportional integration differentiation characteristic (I, PI, or PID characteristics). The channel output switch 6 is so constructed that only the active channel, channel I in FIG. 1, is switched through to the output 7 but the channel II in standby condition is not switched to the output 7. When a switch-over takes place at 3a, 3b, also switch 6a opens and switch 6b closes.

Referring further to FIG. 1, it is clear that each integrator output 12, 12' is directly connected to the negative input of its own summing circuit 8a, 8b, respectively through the conductor 13, 13' respectively. On the other hand, each integrator output is also connected to the positive input of the summing circuits, but not to its own summing circuit, rather, to the positive input of the summing circuit of the other integrator. The conductors 15 and 15' form feedback or closed loop conductors which form with the respective integrator in the standby channel a time delay section or line of the first order ($PT_1$).

As mentioned, the channel I in FIG. 1 is shown in its operating state while the channel II is shown in its standby state. Thus, the input or deviation signal DS passes through analog integrator 5a to the output 7. Simultaneously, the single pole-double throw switch 3b forms the above mentioned time delay section with the integrator 5b and the summing circuit 8b while disconnecting the input signal DS from the input 11' of the integrator 5b. The so formed delay section or delay line is thus capable of delaying the signal at the plus terminal of the summing circuit 8b, which is the signal from the output 12 of the active integrator 5a passing through the buffer amplifier 9a. As a result, the two integrators 5a and 5b operate in synchronism in the stationary and in the quasi-stationary state of the circuit arrangement. In other words, the standby summing circuit follows the summing circuit in the active circuit or in the operating circuit with a time delay which is determined by the time constant of the integrator in the standby channel, namely in the illustrated example, the integrator 5b. The same holds true after switch-over, when the time constant is determined by the integrator 5a.

Figure 2:
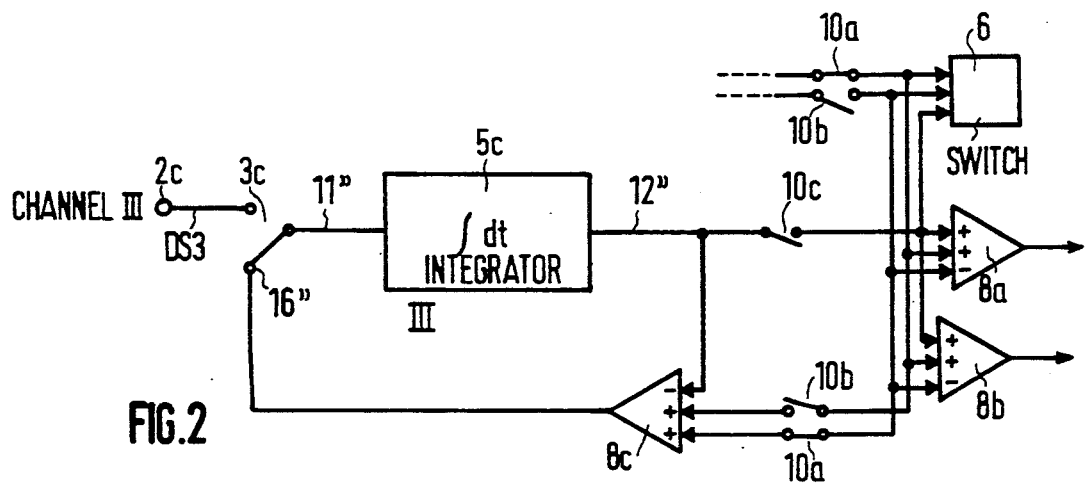

FIG. 2 shows a three-channel closed loop control circuit according to the invention. Since all channels are of the same construction only one channel section is described in detail. The deviation signal DS is also supplied to the input terminal 2c leading to a single pole - double throw switch 3c, the pole of which is connected to the input 11" of the integrator 5c. The output 12" of the integrator 5c is connected to the negative input of its summing circuit 8c which is part of the channel III. The output of the summing circuit 8c is connected to the terminal 16" of the input switch 3c. Thus, the channel 3 is shown in its standby state.

The summing circuit 8c comprises several positive inputs and the above mentioned negative input. The positive inputs of the summing circuit 8c are connected to the outputs of the other integrators 5a, 5b of the circuit arrangement. Switches 10a, 10b are used for this purpose, whereby the switch 10a of the presently operating channel is closed while the switch 10b of a further standby channel II with its integrator, is open, so that the respective signal is not applied to the summing circuit 8c. A further switch 10c connects the output of the standby integrator 5c to the summing circuits 8a and 8b of the other channels when the integrator 5c is switched over into the active state. The switches 3c and 10c are preferably operated in synchronism. The output signal of the switch 10c also is supplied to the output switching unit 6 constructed as shown in FIG. 1, except that it has an additional switch. However, at any one time only one of the switches 10a, 10b, 10c is closed while the others are opened so that only one signal passes through the output switching unit 6, namely that from the present operating or active channel. The switch 10c is not required for a two-channel circuit.

In any embodiment, only one output signal, or rather output switch, will be closed at any one time to supply the output signal of the active channel to the output 7.

Figure 3:
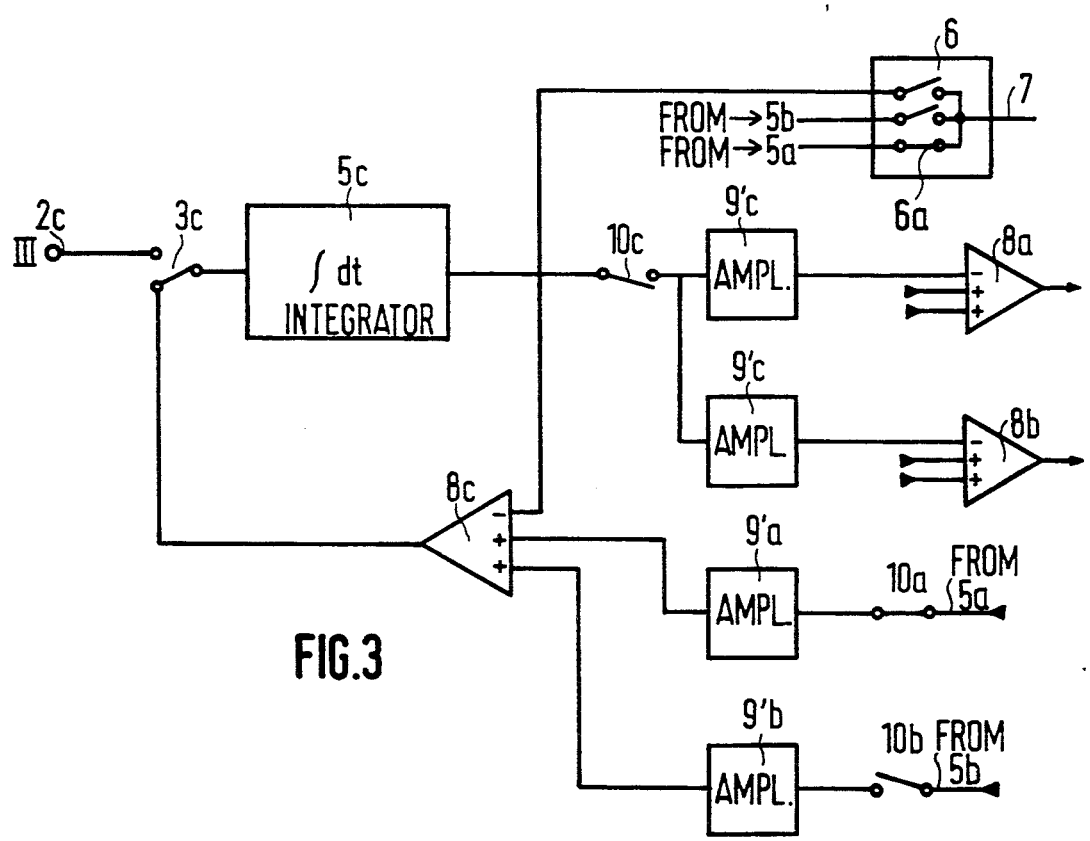
FIGS. 3 and 3a also show an embodiment with three channels, one of which is shown in FIG. 3 and all of which are shown in FIG. 3a, wherein differential amplifiers are provided in the circuit connections between certain integrator outputs and certain summing circuits.

FIG. 3 illustrates a three-channel system which differs from that of FIG. 2 in that high impedance separation amplifiers 9'a, 9'b, and 9'c are connected between the outputs of the integrators and respective inputs of the summing circuits 8a, 8b, and 8c. A switch 10c connects the output of the integrator 5c to the inputs of the separation amplifiers 9'c. These amplifiers in turn are connected to the respective inputs of the summing circuits 8a and 8b in the other channels. The separation amplifier 9'a belongs into the first channel I which, as mentioned, is shown in all figures as the present active or operating channel. Thus, the output signal of the integrator 5a is connected through the switch 6a to the output 7. Additionally, the output of the integrator 5a is connected through the closed switch 10a and the high impedance amplifier 9'a to a positive input of the summing circuit 8c. Switch 10b from the output of the integrator 5b leading to the amplifier 9'b, is open.

Figure 2A:
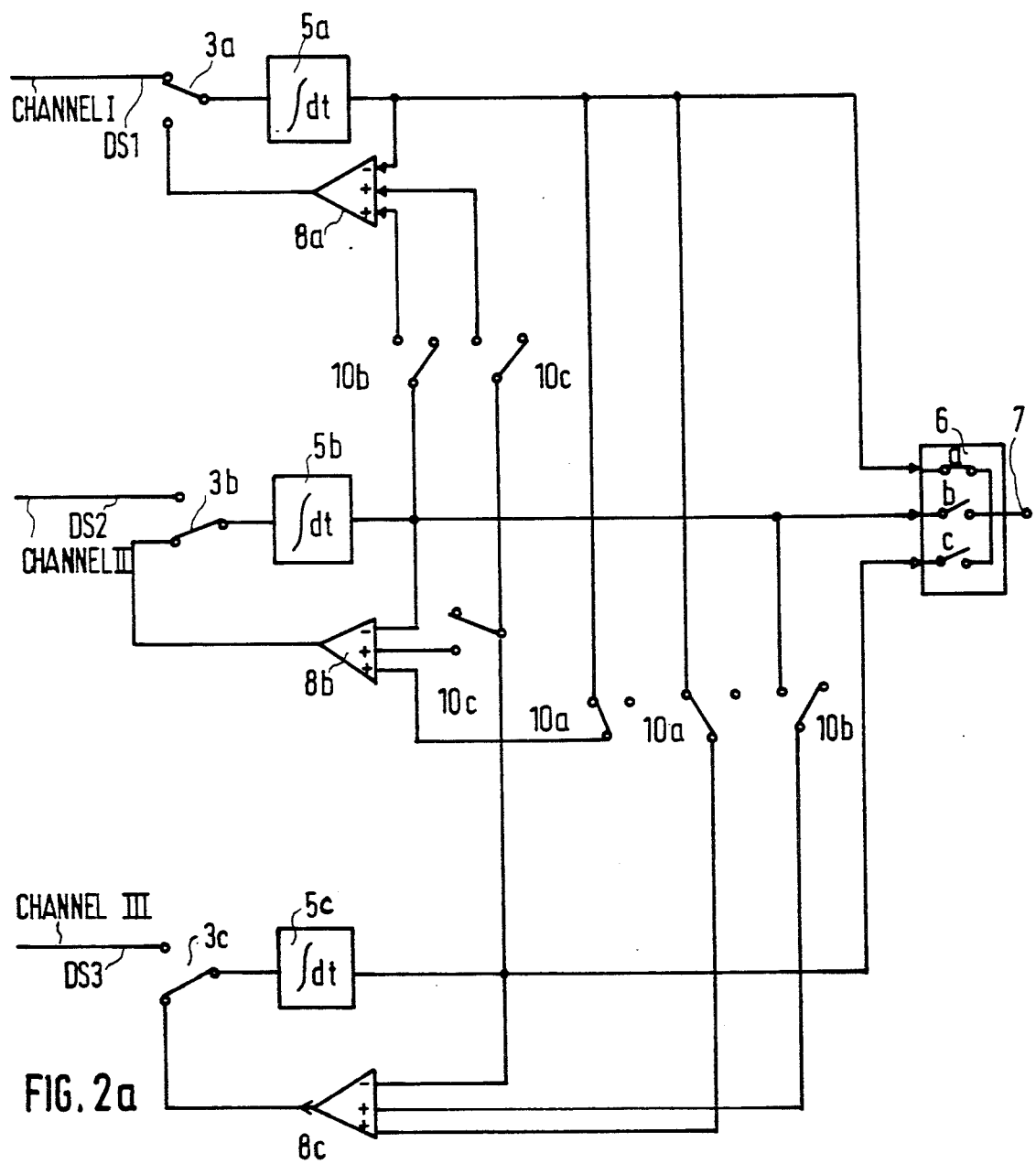
Figure 3A:
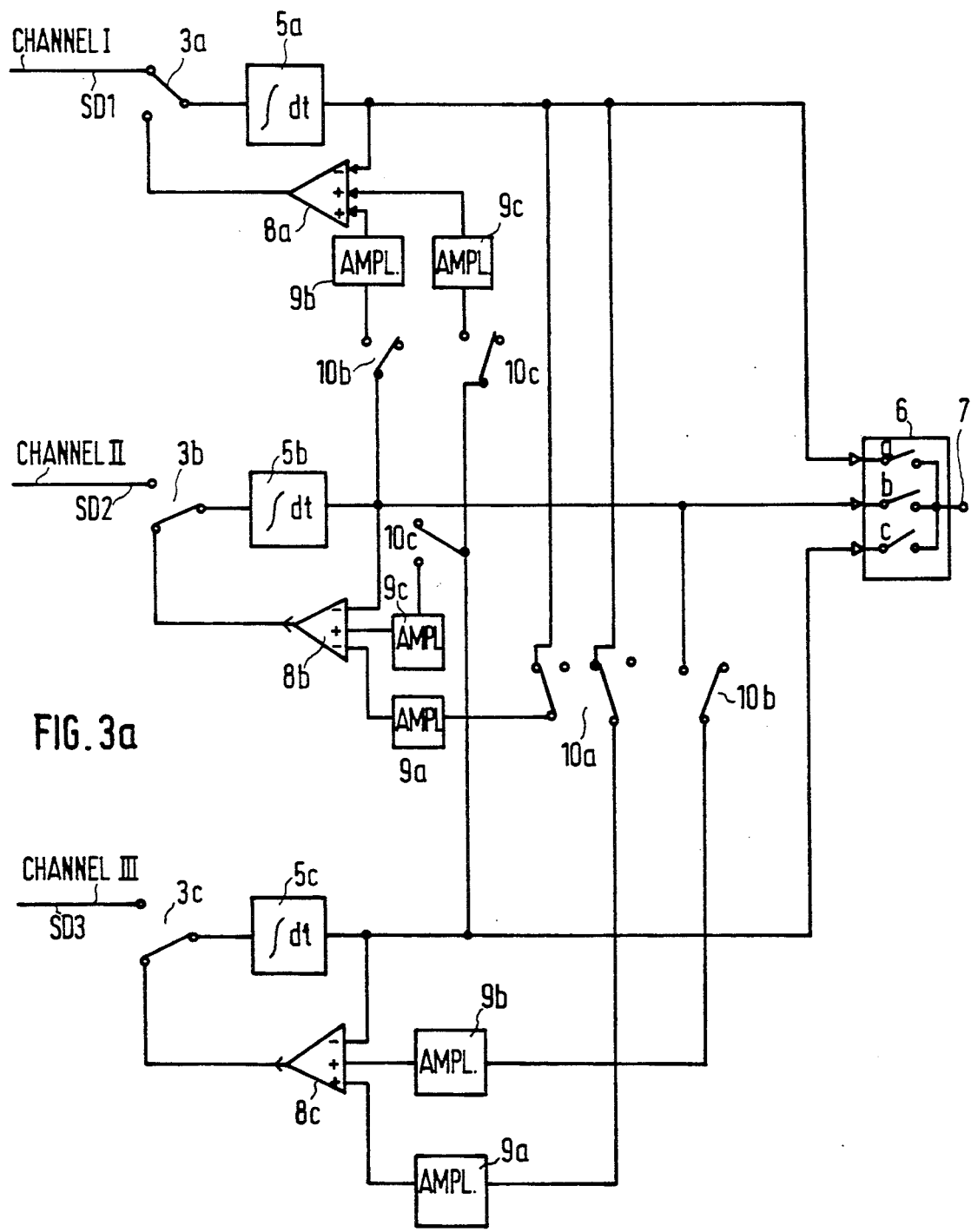

FIGS. 2a and 3a show in more detail what has been described above with reference to the respective companion FIGS. 2 and 3. In each of these three channel embodiments one of the three channels I, II, III is the presently active channel that connects its input signal to the output 7. The other two channels are in a standby mode as described. As shown, channel I is switched through while channels II and III are in standby. Thus, input signal DS1 is switched through while the input signals DS2 and DS3 are not switched hrough.

The various switches are controlled by a logic control circuit not shown, which responds to an input signal that indicates, which of the several redundant, available channels is to be switched through to supply the deviation signal DS from the respective channel input to the output 7, and which of the channels are to be maintained in their standby state. Such logic switch control circuits are not part of this invention.

Although the invention has been described with reference to specific example embodiments it will be appreciated that it is intended to cover all modifications and equivalents within the scope of the appended claims.

What I claim is:

1. A redundant closed loop control circuit, comprising a plurality of signal processing channels for processing a deviation signal through any one of said channels to provide a control output signal at an output of said one channel forming an operating channel while at least one other channel forms a standby channel, each channel comprising a signal integrator having an integrator input and an integrator output, a summing circuit having at least one positive input, a negative input and a sum output, channel input switching means for supplying said deviation signal to a respective one of said integrator inputs, channel output switching means for outputting said control output signal, first circuit means connecting each integrator output to said negative input of its own summing circuit, second circuit means connecting each integrator output to its respective channel output switching means, third circuit means for connecting each integrator output to said positive input of said summing circuit in another of said signal processing channels, and fourth circuit means for connecting said sum output to said channel input switching means for supplying a sum signal to at least one integrator input in a standby channel, wherein said operating channel receives said deviation signal at its integrator input, while all other integrator inputs receive said sum signal formed of their own output signal at said negative input and of other integrator output signals at said positive input of said summing circuits.

2. The redundant closed loop control circuit of claim 1, wherein said plurality of signal processing channels comprises two channels.

3. The redundant closed loop control circuit of claim 1, wherein said third circuit means comprise in each channel a buffer amplifier (9a, 9b) connected between its respective integrator output and a positive input of said summing circuit in another channel.

4. The redundant closed loop control circuit of claim 1, wherein said third circuit means comprise in each channel a differential amplifier connected between its respective integrator output and a positive input of said summing circuit in another channel for providing a high impedance decoupling between the respective signal integrator and said positive input.

5. The redundant closed loop control circuit of claim 1, wherein said signal integrator is an analog signal integrator for integrating said deviation signal.

6. The redundant closed loop control circuit of claim 1, wherein said channel input switching means comprise a single pole-double throw type switch for each channel, whereby said single pole is connected to said integrator input, one throw contact being connected to said sum output, and another throw contact being connected to receive said deviation signal.

7. The redundant closed loop control circuit of claim 6, wherein said single pole-double throw type switches of all channels are ganged.

8. The redundant closed loop control circuit of claim 1, further comprising switching means (10a, 10b, 10c) as part of said third circuit means between each integrator output and said positive summing circuit inputs for controlling an operation of delay circuits formed by said integrators in standby condition and respective summing circuits.

* * * * *